Nov. 11, 1924.
F. A. WHITTEN
1,514,942
UNIVERSAL JOINT
Filed Jan. 30, 1920
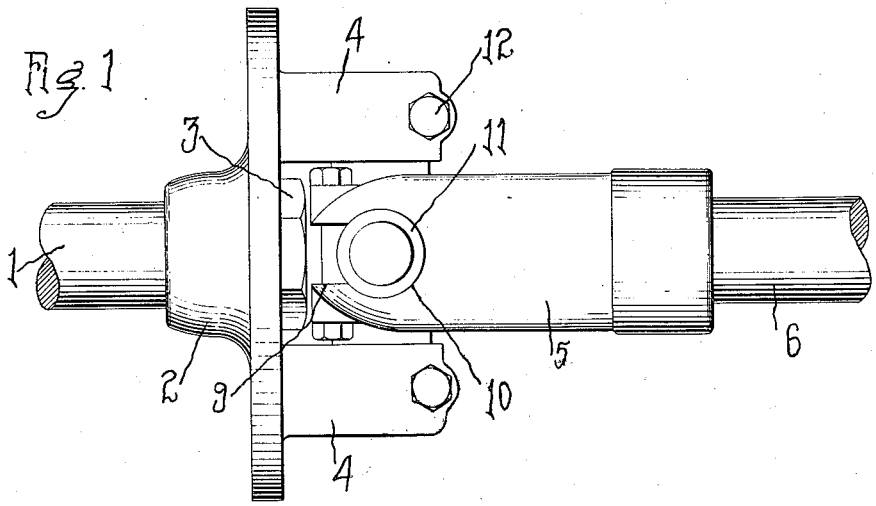
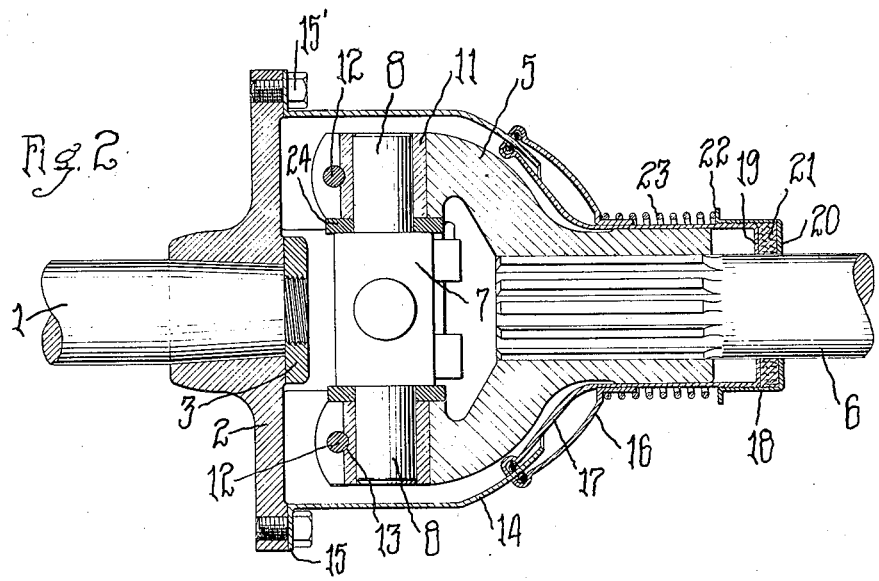
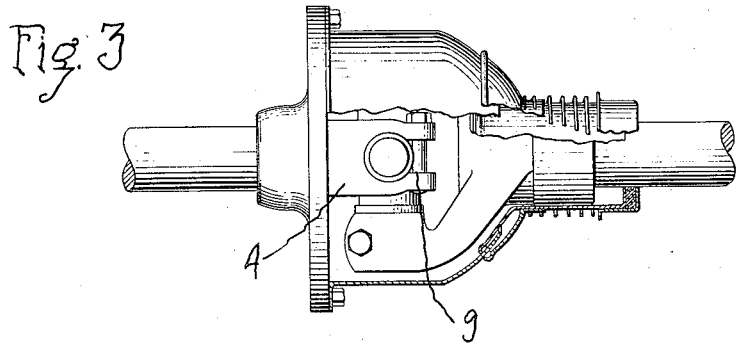
Inventor
Frank A. Whitten
By Attorneys
Blackmore, Spencer & Flint.

Patented Nov. 11, 1924.

1,514,942

UNITED STATES PATENT OFFICE.

FRANK A. WHITTEN, OF DETROIT, MICHIGAN, ASSIGNOR TO GENERAL MOTORS CORPORATION, OF DETROIT, MICHIGAN, A CORPORATION OF DELAWARE.

UNIVERSAL JOINT.

Application filed January 30, 1920. Serial No. 355,243.

*To all whom it may concern:*

Be it known that I, FRANK A. WHITTEN, a citizen of the United States, and a resident of Detroit, county of Wayne, and State of Michigan, have invented certain new and useful Improvements in Universal Joints, of which the following is a full, clear, concise, and exact description, such as will enable others skilled in the art to which the invention relates to make and use the same, reference being made therein to the accompanying drawings, which form a part of this specification.

The invention relates to a universal joint of general adaptability for various purposes but being intended particularly for use in connection with the final transmission of motor vehicles. The invention has for its object the improvements of the construction of devices of this character and especially the provision of a joint of particularly simple and strong construction which shall be capable of being easily assembled and disassembled, having great durability, and including means for efficiently excluding dust, mud, or the like, from the bearing surfaces.

In the accompanying drawing, illustrating one embodiment of my invention,—

Fig. 1 is a plan view of a universal joint.

Fig. 2 is a section through the joint showing the shield or dust guard in position, and Fig. 3 is a view, partly in section, showing the joint at right angles to the position assumed in Fig. 1.

In the drawing, 1 indicates a shaft carrying a flanged head 2 secured to the shaft in any desired manner, as by nut 3. On the flanged head and preferably integral therewith are two bearing members 4, 4, which constitute one fork of the joint. The other fork comprises the member 5 slidably connected to shaft 6, as shown in Fig. 2, or fixed to the shaft in any desired manner. The fork members are pivotally connected for universal movement by the spider 7 having journals 8.

The terminals of the fork members 4 and 5 are slotted, as at 9, the slots being of sufficient width to admit the journals 8. At their bases these slots are enlarged, as at 10, to provide curved seats for the bushings 11, the latter, of course being slipped over the journals after the latter have been positioned in the slots. The bushings are secured against movement by bolts 12 which extend through the jaws on either side of a slot 9 and fit in a groove or notch 13 formed in the bushing, as clearly shown in Fig. 2. The tightening of these bolts will result in contracting the jaws and clamping the bushings securely in place between the respective jaws. A bearing washer 24 may be placed around the journals 8 at the inner ends of the bushings 11 in order to take the wear due to end thrust.

To protect the joint proper from dust and the like as well as to enclose lubricant, I encase the joint in a complete dust-tight housing. This housing comprises the sheet metal casing member 14 bolted or otherwise tightly secured at one end by a flange 15 and securing members 15' to the flanged head 2. At the other end the member 14 is spherically curved approximately concentrically with the center of oscillation of the joint. With this spherical portion engage an outer casing element 16 and an inner casing element 17, both of which may be provided with packing, as shown, adjacent the edges which engage the spherical surface. The elements 16 and 17 are extended along the shaft 6 to form cylindrical sleeves, the sleeve of element 17 fitting loosely about the shank of element 5 and extending beyond that of element 16, and being in screw-threaded engagement with sleeve 18. The sleeve of the element 17 is provided with an inturned flange 19, and the sleeve 18 with a similar flange 20, extending into proximity with the shaft 6 and between which flanges packing material 21 may be placed. The sleeve 18 also has, at the end opposite the flange 20, a flange 22 serving as an abutment between which and casing element 16 is positioned a coiled spring 23.

As will be clear from the description, the expansive pressure of spring 23 will be exerted to force element 16 and flange 22 away from each other, thus causing the packed edges of elements 16 and 17 to engage yieldingly against the exterior and interior, respectively, of member 14. It will be seen that the encasing means permits a considerable range of oscillation of the joint and also of sliding movement of the shaft 6 while enclosing both the universal joint and the slip joint, meanwhile maintaining a yielding pressure to keep a tight fit between the relatively movable parts of the casing.

It will also be seen that the casing element 14 is rigidly secured to one of the joint members, but that the additional casing elements 16 and 17 are not secured to the joint but have only sliding engagement with the shaft 6, the joint member 5, and the casing element 14. It will be clear therefore that the casing elements are free to assume any position necessary under the ordinary movements of the parts of the joint without binding or restricting the movements of the joint.

It will be understood that various changes may be made in the specific details of construction without departing from the spirit and scope of the invention and therefore I do not desire to be limited to the particular structure shown.

I claim:—

1. The combination with a power transmitting connection comprising a universal joint and a slip joint of a casing therefor comprising a housing element surrounding said universal joint and provided with a curved portion, and an additional housing element engaging the inner surface of said curved portion and extended to enclose said slip joint.

2. The combination with a power-transmitting connection comprising a universal joint and a slip joint, a housing element surrounding said universal joint and having a portion of spherical curvature, an additional housing element engaging the inner surface of said curved portion and extended to enclose said slip joint, a second additional housing element engaging the outer surface of said curved portion, and means for forcing said additional elements into yielding engagement with said curved portion.

3. The combination with a power-transmitting connection comprising a universal joint and a shaft having a slidable connection therewith, a housing element surrounding said universal joint, a casing element engaging the inner surface of said housing element and extended to enclose said slidable connection, a sleeve mounted upon the outer end of said casing element, packing supported between said sleeve and said casing element and engaging with said shaft, a second casing element engaging the outer surface of said housing element, and a spring operating between said second casing element and said sleeve.

4. The combination with a universal joint and a power-transmitting shaft extending therefrom of a casing member surrounding said joint and having a portion of approximately spherical curvature, a second casing member engaging at one end the interior of said curved portion, a sleeve seated on the other end of said second member, sealing means held in position by said sleeve and second member and engaging said shaft, a third casing member slidably mounted upon said second member and engaging the exterior of said curved portion, and resilient means positioned between said sleeve and said third member and operative to force said second and third members into engagement with said curved portion.

In testimony whereof I affix my signature.

FRANK A. WHITTEN.